No. 851,475. PATENTED APR. 23, 1907.
A. P. ALBERT.
COTTON PICKING APPARATUS.
APPLICATION FILED AUG. 4, 1905.
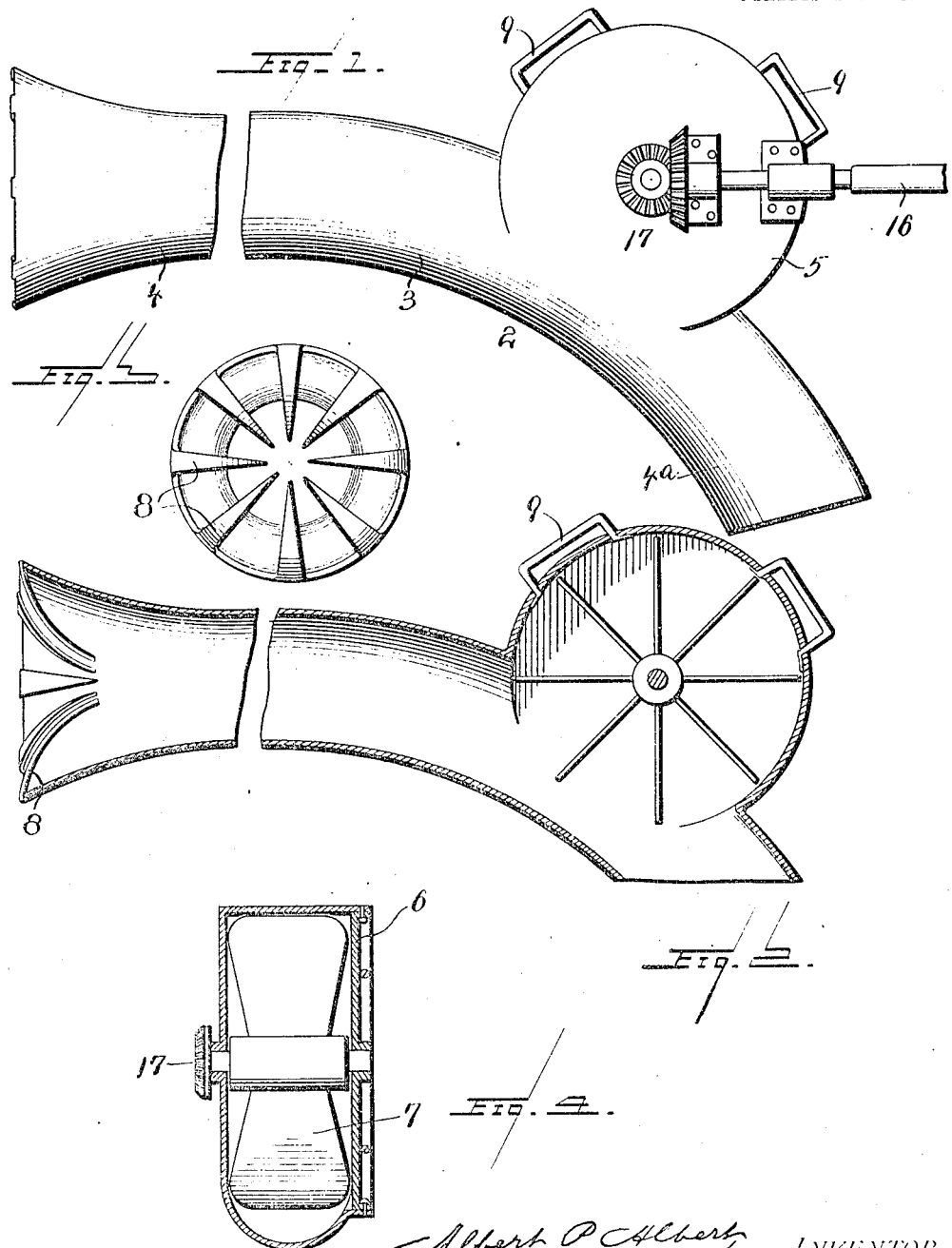

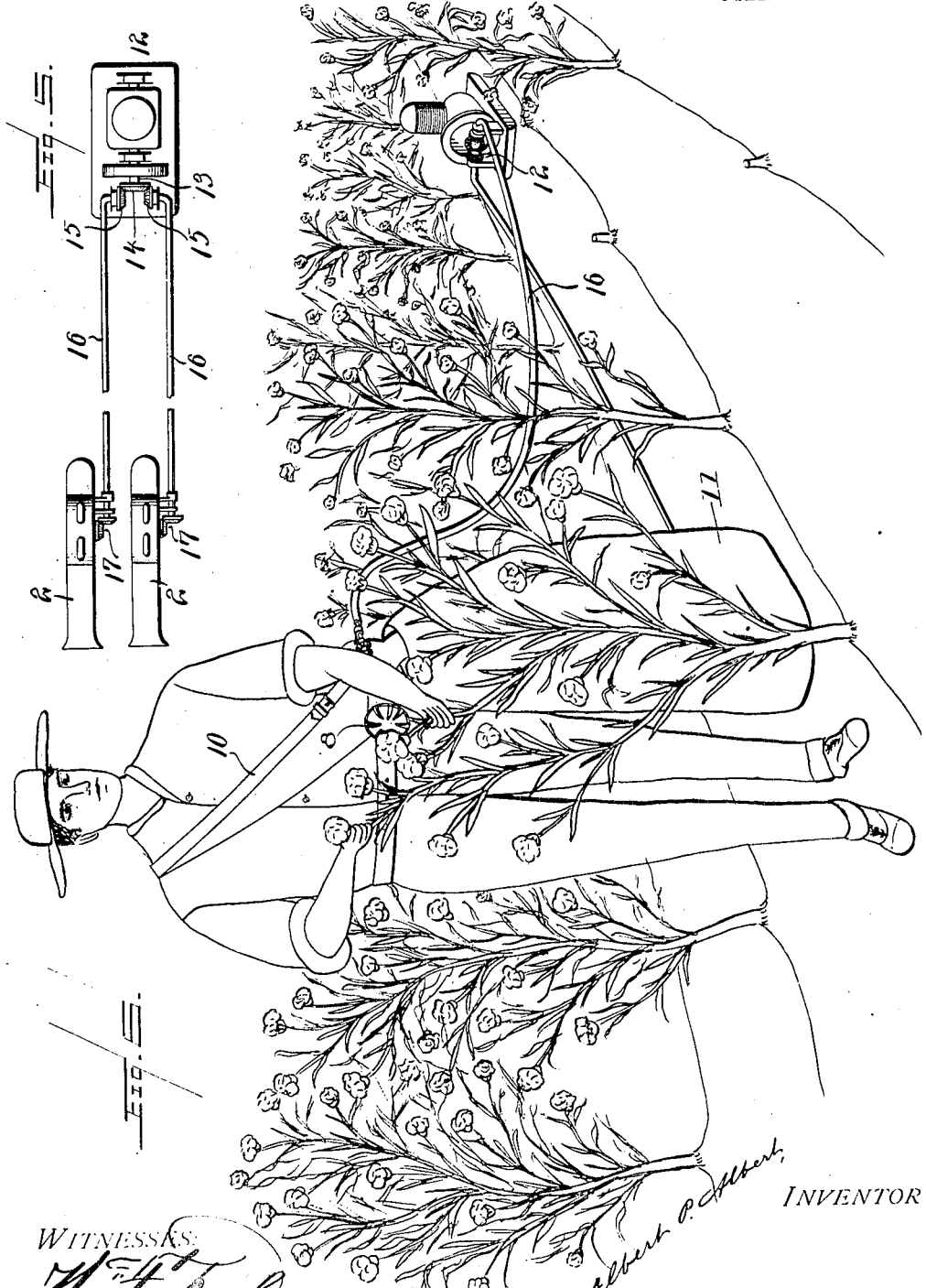

No. 851,475. PATENTED APR. 23, 1907.
A. P. ALBERT.
COTTON PICKING APPARATUS.
APPLICATION FILED AUG. 4, 1905.
3 SHEETS—SHEET 3.
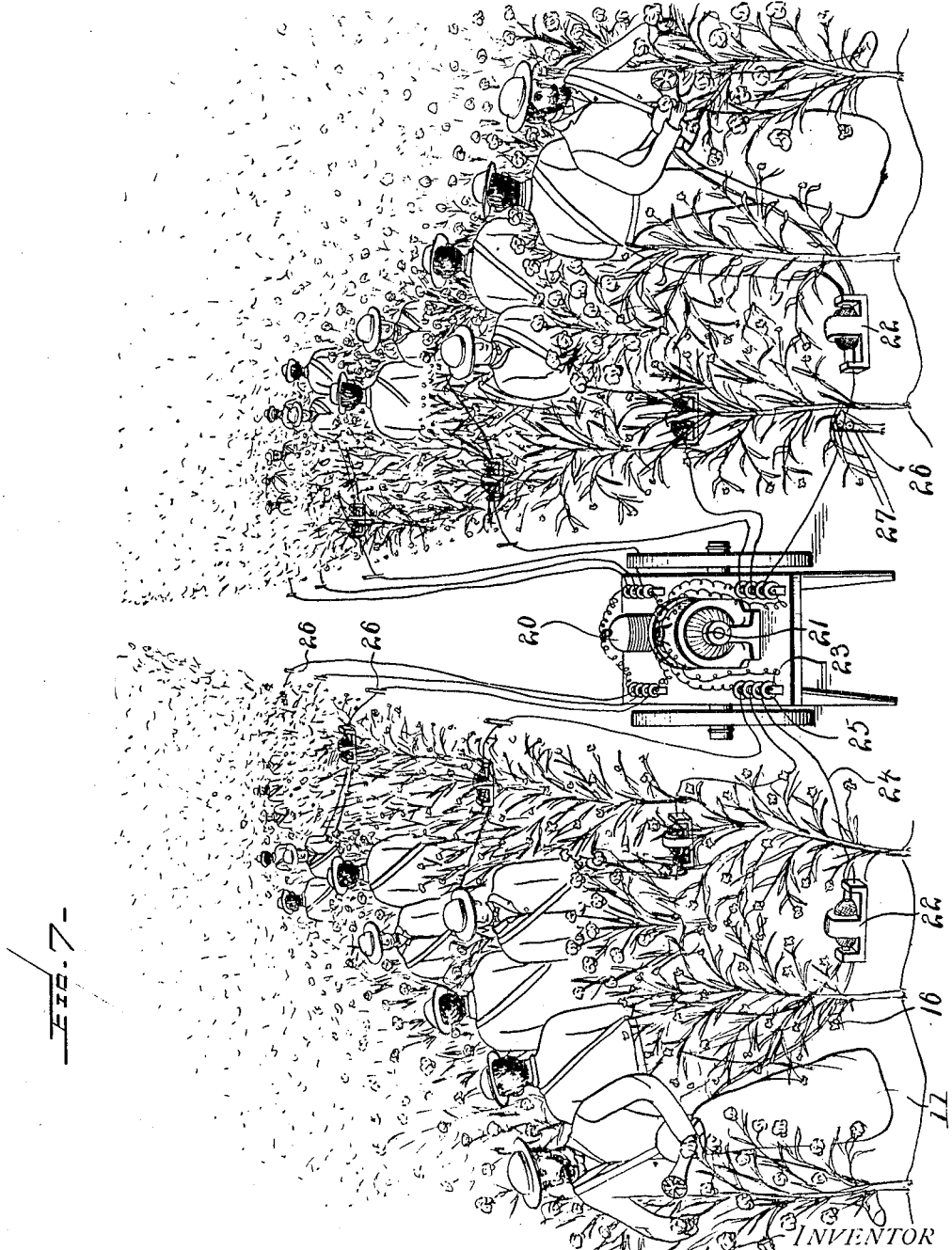

UNITED STATES PATENT OFFICE.

ALBERT P. ALBERT, OF NEW ORLEANS, LOUISIANA.

COTTON-PICKING APPARATUS.

No. 851,475.     Specification of Letters Patent.     Patented April 23, 1907.

Application filed August 4, 1905. Serial No. 272,707.

*To all whom it may concern:*

Be it known that I, ALBERT P. ALBERT, a citizen of the United States, residing at New Orleans, parish of Orleans, State of Louisiana, have invented certain new and useful Improvements in Cotton-Picking Apparatus, of which the following is a specification.

This invention relates to a cotton-picking apparatus.

The apparatus involves in its make-up a pneumatic cotton-picking conduit, which may consist of a tube or pipe, and it is one of the objects of the invention to provide means, in connection with this conduit, and, independent of the air passing therethrough, for separating cotton from the boll. Said means may be of any suitable character and in practice operates in a positive and efficient manner.

Where suction is employed to pick cotton it is not possible at times to secure thereby the separation of the cotton from the boll, and it is for this purpose that the means indicated is provided; for should the suction be not sufficient to separate the cotton from the boll the means in question will do so in a satisfactory, efficient manner. The conduit or pipe, to which I have referred, in practice will have directly associated therewith a fan, and the fan may be of any suitable character, adapted, when operated, to create suction through conduit or pipe for the purpose of drawing cotton thereinto and through the same.

Means of some suitable character will be provided for adapting the said conduit or pipe to be supported from the person. A cotton picker, therefore, can wear the pipe suspended from his body so as to leave his hands wholly free, while the inlet end of the pipe can be so operated as to reach bolls on the plant either near or at any point above the ground. Existing apparatus operating pneumatically possesses the objection that it takes up both ripe cotton and immature bolls, while by my device or apparatus I need pick only the ripe cotton, and this without possibility of injury to the growing plants or to the immature bolls.

In the accompanying drawings forming a part of this specification is illustrated a simple form of my invention and in which:

Figure 1 is a side elevation of a cotton-picking device, embodying my invention. Fig. 2 is a vertical longitudinal sectional view through the same. Fig. 3 is a detail view of the inlet end of the conduit. Fig. 4 is a sectional view taken through the fan casing. Fig. 5 is a diagrammatic view illustrating two of the cotton-picking devices and suitable connections with a motor. Figs. 6 and 7 are diagrammatic views showing the mode of operation of the cotton-picking device and different types of motors for operating the fans of said picking devices.

Like characters refer to like parts throughout the several figures.

In Figs. 1 to 4 of the drawings I show upon an enlarged scale a cotton-picking device involving my invention. Said cotton-picking device is denoted in a general way by 2 and may consist of a pipe or tube 3 preferably of metal and terminal portions 4 and 4ª also of metal or hard rubber or other suitable material. The inlet end 4 of the pipe or tube may be outwardly flared or enlarged, as shown clearly in Figs. 1 and 2, to provide for the ready entrance thereto of the cotton.

In the form of the invention illustrated, a fan or other air exhausting or suction creating device is connected or directly supported by the conduit, the body or casing 5 of the fan intersecting the conduit as shown best in Fig. 2. The fan illustrated is of the ordinary type and needs no specific description. One of the walls of the casing, as 6, may be made removable so that ready access may be had to the fan in order to make repairs thereto or to replace the same. The blades, 7, of the fan extend partly into the conduit or pipe and when the same are rotated create a suction therethrough. The interior of the conduit is smooth so as to offer no obstruction to the passage of cotton therethrough. In the present instance the fan is shown as directly secured to the picking conduit or pipe in any convenient or preferred manner, and is supported from the person operating or using the device.

As stated hereinbefore cotton sometimes adheres to the boll, from different causes, so firmly that suction alone fails to remove it, and in order to pick such adhering cotton I provide means, coacting with the suction, to positively engage and separate such cotton from the boll. The means employed for this purpose is located at the inlet end of the picking conduit 2 and consists of several fingers 8 located within the mouth or inlet end of the conduit. The fingers are rigidly secured within the inlet end or mouth of the conduit or pipe and are sharpened or pointed in order to take firm hold upon cotton drawn into the conduit or pipe by suction, but which the latter fails to detach from the boll. As the fingers, 8, are located within and turn back into the pipe, it will be evident that as the inlet end of the conduit is placed over a boll they will not tend to draw into the pipe any boll or surrounding foliage. They really present a skeleton or grid construction at the inlet end of the conduit which does not prevent the free entry of cotton by suction into said conduit. In practice the inlet end of the conduit will be placed in proximity to a boll, and if the fan, 7, be in operation the suction produced thereby will draw the cotton from the boll into the conduit and will carry it entirely along said conduit to the delivery end of the latter, where it can be discharged into a bag suspended from the operator. If any of the cotton thus drawn into the inlet end of the pipe adheres to the boll and the suction is insufficient to separate it therefrom, the projections or fingers grasp or engage the cotton and the operator by either moving the conduit away from the boll, or removing the boll from the end of the conduit by hand, causes the projections or fingers to pull or draw the adhering cotton from the boll, and when the separation takes place the exhaust through the conduit will carry the cotton thus separated entirely through said conduit. In this action the pointed or sharp ends of the projections or fingers grasp and take a firm hold upon the cotton, and to aid in the separating function the projections are somewhat inwardly curved so as to retain their hold on the cotton.

The picking device may be supported from the person in any desired manner. For this purpose I have represented the fan casing, 5, as having two loops, 9, through which a strap, 10, or its equivalent can be passed, as shown in Figs. 6 and 7. The strap can then be placed about the shoulders or around the body and buckled in place so as to suspend the said picking device therefrom for use. In this way both hands of the operator are left free so that he can draw the bolls within operative proximity to the inlet end of the said picking device. In said Figs. 6 and 7 I have shown a bag, 11, as supported from the shoulders of the operator and the delivery end of the conduit or pipe is shown as entered in the mouth of the bag to deliver cotton thereinto.

In Fig. 5 I have shown a motor, 12, of the hydrocarbon type. This is not necessary to describe in detail, as it is or may be of ordinary construction. In order to adapt such a motor to operate a plurality of picking devises, its shaft, 13, is represented as having a beveled gear, 14, in mesh with cooperating beveled gears, 15. The gears, 15, may be supported upon the frame of the motor, 12, in any desired manner, and they are located at the inner terminal ends of shafts, 16. These shafts are of the flexible type and are shown as connected by beveled gearings, 17, with the fan, 7. (See Figs. 1 and 4.) It therefore follows that when the motor, 12, is in action the fan or fans, 7, will, through the intermediate mechanism, be operated so as to exhaust through the conduit, 2, from the inlet toward the delivery end thereof. By reason of the fact that the shafts, 16, are flexible, the picking devices 2, can be freely moved from place to place without stopping the fans forming a part thereof, while the motor is in operation.

In Fig. 6 is shown a picking device carried by a person and operated by a motor, 12, through the connections described above.

In Fig. 7 I show a motor, 20, also of the gasoline type. This motor serves to operate a dynamo, 21, which can be utilized for operating several electric motors, as 22, placed at convenient or desired points about the cotton field. In the present case the motor, 20, and the dynamo, 21, are portable, for which purpose they are represented as carried upon a vehicle, 23.

The organization shown in Fig. 7 is particularly adapted for cotton fields which extend over wide areas. Connecting the dynamo and the motors are wires, 24. These wires may be wound upon reels, 25, fastened upon the vehicle, 23; and the vehicle may also carry the motors, 22, when it is necessary to cover a new field of operation. The motors, 22, are connected with the respective picking devices, 2, as by a flexible shaft, 16, similar to the shaft hereinbefore described, or in any other preferred manner. I may drive stakes, as 26, along the furrows, each stake being provided with superposed antifriction wheels, 27, between which the respective pairs of conducting wires, 24, are led. The stakes are driven into the space between the patches. By running the wires between the guide wheels, I dispose the wires in angular form, the inner branches thereof extending longitudinally of such space and the outer branches transversely thereto. In this way I can so dispose the wires that they cannot sweep down the plants as they would do were they free from the picking devices to the motor.

Having described the invention, what I claim is:

1. A pneumatic cotton-picking device comprising a conduit, and a plurality of fixed projections or fingers forming a grid at the inlet end of said conduit and adapted to engage the cotton.

2. A pneumatic cotton-picking device comprising a conduit, and a plurality of inturned projections or fingers rigidly secured at the inlet end of said conduit to form a grid and adapted to engage the cotton.

3. A pneumatic cotton-picking device comprising a conduit having a flaring inlet end, and a plurality of sharpened projections or fingers rigidly secured at and projecting into said inlet end and forming a grid.

4. A pneumatic cotton picking device comprising a manually supported conduit having its ends opening in opposite directions, means intermediate the ends of and supported by said conduit for creating an air suction therethrough, said means comprising a fan the blades of which dip or project into and extend partly across the conduit, whereby a space is provided for the uninterrupted passage of the cotton through the conduit.

5. A pneumatic cotton picking device comprising a cotton receiving conduit, means for supporting said conduit from the person with its receiving end toward the front and its discharge end toward the rear of the operator, a fan the blades of which dip into and extend partly across said conduit operating to produce a current of air therethrough, a motor, and means for operating the fan from the motor.

6. A pneumatic cotton picking device comprising a conduit, a suction fan supported by and having its blades extending into and partly across said conduit, means for supporting the conduit from the person, a motor supported independently of the conduit, and connecting means for operating the fan from the motor.

In testimony whereof I have hereunto set my hand in presence of two subscribing witnesses.

ALBERT P. ALBERT.

Witnesses:
JAMES L. BROWN,
WILLIAM H. McGRANN.